(12) United States Patent
Memoli et al.

(10) Patent No.: US 11,421,289 B2
(45) Date of Patent: *Aug. 23, 2022

(54) METHOD AND APPARATUS FOR THE PRODUCTION OF CAST IRON, CAST IRON PRODUCED ACCORDING TO SAID METHOD

(71) Applicant: TENOVA S.P.A., Milan (IT)

(72) Inventors: Francesco Memoli, Pittsburgh, PA (US); Cesare Giavani, Milan (IT); Silvio Maria Reali, Milan (IT); Kyle James Shoop, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/214,401

(22) Filed: Mar. 26, 2021

(65) Prior Publication Data

US 2021/0214812 A1 Jul. 15, 2021

Related U.S. Application Data

(63) Continuation of application No. 15/763,441, filed as application No. PCT/EP2017/062860 on May 29, 2017, now Pat. No. 10,995,379.

(30) Foreign Application Priority Data

May 31, 2016 (IT) .......................... 102016000056295

(51) Int. Cl.
*C21B 13/14* (2006.01)
*C22C 33/08* (2006.01)
(Continued)

(52) U.S. Cl.
CPC ............ *C21B 13/143* (2013.01); *B22F 9/082* (2013.01); *C21B 11/10* (2013.01);
(Continued)

(58) Field of Classification Search
CPC ..... B22F 9/082; C21B 11/10; C21B 13/0086; C21B 13/12; C21B 13/143; C21C 1/08;
(Continued)

(56) References Cited

U.S. PATENT DOCUMENTS 4,252,559 A * 2/1981 Allain ...................... C21B 11/10
75/10.61
5,810,905 A * 9/1998 Shultz ................... C21B 13/002
75/10.63
10,995,379 B2 * 5/2021 Memoli .................... C21C 1/08

* cited by examiner

*Primary Examiner* — Jessee R Roe
*Assistant Examiner* — Michael Aboagye
(74) *Attorney, Agent, or Firm* — Themis Law

(57) ABSTRACT

A method for the production of cast iron starting from pre-reduced iron ore (DRI) with an electric arc furnace includes the steps of preparing a charge of pre-reduced iron ore DRI having a metallization higher than 90% and containing over 2.8% by weight of carbon, wherein at least 80% of the carbon is combined with the iron to form iron carbide $Fe_3C$; charging the charge of pre-reduced iron ore into the electric arc furnace; and melting the DRI charge to form liquid cast iron having at least 80% by weight of actual carbon content deriving from the carbon in the charge of pre-reduced iron ore, the melting step being in a reducing atmosphere and in a melting chamber of the electric arc furnace subjected to a positive internal pressure generated by the gases produced by reduction reactions that develop during melting.

6 Claims, 1 Drawing Sheet

(51) Int. Cl.
  *B22F 9/08* (2006.01)
  *C21B 13/12* (2006.01)
  *C21C 1/08* (2006.01)
  *C21C 5/52* (2006.01)
  *C21B 13/00* (2006.01)
  *C22C 37/00* (2006.01)
  *C21B 11/10* (2006.01)
  *C22C 33/02* (2006.01)

(52) U.S. Cl.
  CPC .......... *C21B 13/0086* (2013.01); *C21B 13/12* (2013.01); *C21C 1/08* (2013.01); *C21C 5/5211* (2013.01); *C22C 33/0271* (2013.01); *C22C 33/08* (2013.01); *C22C 37/00* (2013.01); *Y02P 10/20* (2015.11)

(58) Field of Classification Search
  CPC ... C21C 5/5211; C22C 33/0271; C22C 33/08; C22C 37/00
  USPC ........ 75/10.61, 10.62, 10.63, 472, 484, 504, 75/770; 164/495
  See application file for complete search history.

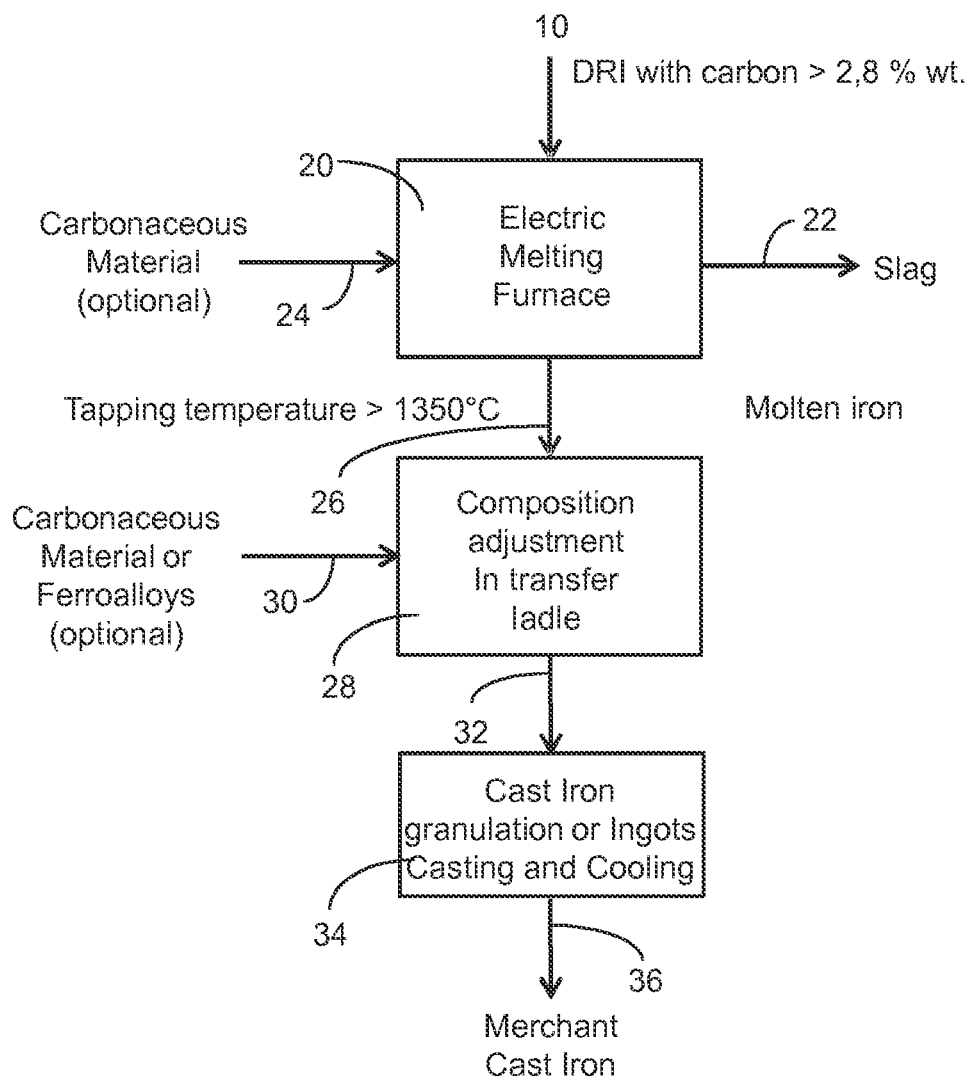

METHOD AND APPARATUS FOR THE PRODUCTION OF CAST IRON, CAST IRON PRODUCED ACCORDING TO SAID METHOD

FIELD OF THE INVENTION

The present invention relates to a method and an apparatus for the production of cast iron according to the preamble of the relative enclosed independent claims.

The technical field to which the invention relates is therefore that of the production of iron and steel, in which ferrous materials such as cast iron are widely used.

BACKGROUND OF THE INVENTION

In the field of reference, the term "cast iron" indicates a variety of ferrous materials generally produced in blast furnaces, containing at least 92% (by weight) of Iron and 2.1% (by weight) of Carbon and traces of other elements; over time, cast iron has become a real "commodity" in the steel industry as a source of metallic iron for the production of high-quality steels.

Cast iron is in fact used in electric arc furnaces (hereinafter referred to as EAFs, for providing certain quantities of iron necessary for counterbalancing undesired elements contained in steel scraps normally introduced into EAFs: cast iron in fact helps dilute residual elements such as copper and tin present in trace amounts in scraps; cast iron also contributes to minimizing nitrogen levels of molten iron in EAFs.

Cast iron is also used in place of other metallic iron materials such as high-grade steel scraps or pre-reduced iron ore (also known as DRI, Direct Reduced Iron).

Cast iron is a ferrous material with a high carbon content normally cast into 200 mm×100 mm×50 mm ingots or other forms of ingots.

Cast iron is generally produced in blast furnaces but other processes are also known for producing molten iron with a high carbon content.

There are three main categories of cast iron:

basic cast iron, used for steelmaking, grey cast iron for the production of castings (also called lamellar), nodular (or spheroidal) cast iron used for the production of high tensile castings.

These categories of cast iron mainly differ in the silicon and phosphorous content.

A typical analysis of the cast iron categories indicated above is represented in Table 1 hereunder:

TABLE 1

|    | Basic   | Grey    | Nodular |
|----|---------|---------|---------|
| Si | <1.5%   | 1.5-3.5% | 0.5-1.5% |
| C  | 2.1-4.5% | 3.5-4.5% | 3.5-4.5% |
| Mn | 0.4-1.0% | 0.4-1.0% | <0.05%  |
| P  | <0.12%  | <0.12%  | <0.04%  |
| S  | <0.05%  | 0.05%   | <0.02%  |

As already mentioned, a method for the production of cast iron is that in blast furnaces; details on this aspect are not described herein, as the manufacturing of cast iron in blast furnaces is a process well known to skilled persons in the field.

As is known, blast furnaces have certain limits however: they require coke, they have relatively lengthy production cycles, and above all generate high $CO_2$ emissions, which require careful control and devices specifically produced for complying with the constraints of environmental regulations which are becoming increasingly strict.

Furthermore, the production quantities of blast-furnace cast iron are extremely difficult to regulate: stopping the blast furnace in fact often, if not always, involves the complete replacement of its refractory material, with everything that ensues; the result is that it is therefore difficult or extremely uneconomic to produce limited amounts of cast iron.

Various solutions have been developed for partially solving these drawbacks.

U.S. Pat. No. 1,686,075, for example, describes a process for producing synthetic cast iron by means of a reduction process within a temperature range of 900°-1,200° C. producing so-called sponge iron. The sponge iron is freed from its gangue by magnetic separation; a carbonaceous material is added and is melted in an electric furnace under acid conditions at a temperature ranging from 1,100° C. to 1,300° C. Suitable quantities of silicon, manganese and other elements are added to the molten bath to obtain the desired composition. A limit of this solution is linked to the fact that a further operation for the addition of carbonaceous material is required, with a consequent increase in the energy used in the process.

A further solution is described in U.S. Pat. No. 3,165,398 which discloses a process for melting sponge iron wherein the melting temperature is gradually lowered by adding powdered carbonaceous material. The charge is slowly and continuously stirred by rotation of the melting furnace. Also in this case, therefore, there is the separate addition of carbon to the sponge iron in the melting phase, with substantially the same limits as those previously described; furthermore the presence of continuous stirring in the furnace creates further limits deriving from the necessity of having to provide expedients specifically suitable for the purpose.

U.S. Pat. No. 4,661,150 discloses a method and apparatus for producing liquid cast iron in an electric furnace into which pre-reduced iron ore (DRI) characterized by a metallization higher than 60% is charged, together with residual carbon coming from a reduction process. This solution however has limits due to the fact that most of the carbonaceous material added to the melting furnace is consumed to complete the reduction of the remaining iron oxides.

Other solutions of the prior art, such as those described in U.S. Pat. No. 5,810,905 and European Patent 0871781, disclose melting the pre-reduced iron ore (DRI) in a submerged arc furnace, which is more expensive in terms of both investment and operating costs; this solution, however, has proved to be relatively advantageous as these furnaces operate with a thick layer of slag over the melt which to some degree protects the carbon from oxidation. These solutions however use pre-reduced iron ore having an overall low metallization and/or low carbon content or use scrap as the iron source, which entails the disadvantage of having to introduce elements such as carbon, silicon and manganese during the melting step with consequent higher costs for the ferroalloys and longer duration of the casting cycles of the melting furnace.

From the above discussion, the need therefore emerges for a method (and relative equipment) for the effective production of cast iron for the manufacturing of steel or foundry products starting from iron ore.

SUMMARY OF THE INVENTION

An objective of the present invention is therefore to provide a method and an apparatus for the production of cast iron which overcomes the drawbacks of the prior art.

A further objective of the invention is to provide said method and apparatus which are relatively economical and practical.

Another objective of the invention is to provide said method and apparatus which allow the production of cast iron also in reduced quantities.

Yet another objective of the invention is to provide said method and apparatus for producing cast iron starting from DRI containing carbon using an arc electric furnace.

A further objective of the present invention is to provide said method and apparatus which reduces environmental impact in terms of carbon dioxide emissions with respect to the methods and apparatuses normally adopted for this purpose.

Further objectives of the invention will appear evident to skilled persons in the field, or will become more apparent in the detailed description of the invention.

These and other objectives are achieved by means of a method and apparatus according to the invention.

The idea behind the invention is to produce cast iron through pre-reduced iron ore (DRI) with a high carbon content, preferably present in the form of iron carbide.

This is advantageous as carbon combined in this form remains in the iron bath in an energetically effective way; it should be considered that providing carbon to the melt as free carbon implies a high energy cost for its solution in the iron matrix.

More specifically, the invention provides a method and an apparatus for producing cast iron using DRI with a high carbon content as iron source and carbon in an apparatus comprising an electric arc furnace EAF for producing cast iron having the desired carbon content, with numerous technical and economic advantages.

A first object of the invention therefore relates to a method for the production of cast iron starting from pre-reduced iron ore or DRI wherein the iron has a metallization higher than 90% by weight, and contains high carbon levels; the DRI is melted in an electric arc furnace or EAF to form liquid cast iron and the regulation of the carbon content of the cast iron mainly derives from the carbon contained in said DRI.

A second object of the patent relates to an apparatus which implements said method.

A further object of the patent relates to a cast iron produced with said method.

The characteristics of the method, apparatus and/or cast iron are described in detail hereunder and claimed in the following claims which should be considered as being an integral part of the present description.

The documents cited in this text (including the previously listed patents), and all documents cited or indicated in the documents cited in this text, are incorporated herein for reference.

Documents incorporated for reference in this text or any teaching therein may be used in the practice of the present invention.

BRIEF DESCRIPTION OF THE DRAWINGS

The structural and functional characteristics of the invention, and its advantages with respect to the known art, will be apparent from the following description, referring to FIG. 1 enclosed, which is a schematic block diagram illustrating a non-limiting embodiment of the invention showing the main operations of the method.

With the intent of first describing the method in its general features, this is destined for the production of cast iron starting from pre-reduced iron ore (DRI) using an apparatus comprising an electric arc furnace (EAF).

The term "cast iron" refers herein and in the following claims to any type of cast iron.

The method of the invention characteristically comprises the following steps:

a. preparing a charge of pre-reduced iron ore (DRI) having a metallization higher than 90% and containing over 2.8% by weight of carbon, wherein at least 80% of said carbon is combined with the iron to form iron carbide $Fe_3C$, b. charging the charge of pre-reduced iron ore (DRI) into the electric arc furnace (EAF), c. melting the DRI charge to form liquid cast iron wherein said liquid cast iron has a predetermined target content of carbon, at least 80% by weight of said target carbon content of the cast iron deriving from the carbon in the charge of pre-reduced iron ore (DRI), wherein step c. is effected in a reducing atmosphere condition and in a melting chamber of the electric arc furnace (EAF) subjected to a positive internal pressure generated by gases produced by reduction reactions that develop in step c.

An upper limit of the carbon content by weight of the charge of pre-reduced iron ore (DRI) is preferably 6.5% by weight.

A large percentage, normally higher than 90% by weight of carbon in the charge of pre-reduced iron ore (DRI) is preferably combined with the iron in the form of iron carbide $Fe_3C$; this avoids having carbon in the form of graphite which would be mostly lost in the slag.

In particular, the method is carried out in an apparatus which implements the method and comprises an electric arc furnace (EAF) equipped with a melting chamber in which the electrodes are active.

The melting chamber of the apparatus in which the DRI charge is melted, is subjected to slightly positive pressure to prevent or in any case limit the inlet of air from the outside, avoiding the oxidation of the carbon present in the metal bath.

According to an advantageous optional feature, step a. provides the heating of said DRI charge to a temperature higher than 400° C., completely favoring energy saving in the melting process.

According to other variants, an additional step is optionally provided b1—for the addition, to the pre-reduced iron ore charge (DRI), of a carbonaceous material in the electric arc furnace (EAF) in order to regulate the carbon content, said step b1 being effected between steps b. and c. either contemporaneously with step b. or contemporaneously with or downstream of step c.

According to other variants, an additional step d. is optionally provided, for discharging the contents of the EAF furnace—downstream of (after) step c. into a transfer ladle or container.

The additional step is also optionally provided d1. of adding a carbonaceous material to said transfer ladle.

Said carbonaceous material, of step b1 or d1, is generally selected from the group of coal, coke, graphite, or mixtures thereof.

The liquid cast iron is then solidified from the ladle according to one of the following alternative steps:
e. granulation of the liquid cast iron
f. casting the liquid cast iron into ingots.

The cast iron thus obtained is basic cast iron, and comprises, in addition to iron, the following weight percentages of elements:
Carbon 2.1-4.5%
Silicon <1.5%
Manganese 0.5-1.0%
Sulfur <0.05%
Phosphorous <0.12%

In other preferred embodiments, the cast iron obtained is grey cast iron or nodular cast iron.

The grey cast iron thus produced even more preferably comprises, in addition to iron, the following weight percentages of elements:
Carbon 3.5-4.5%
Silicon 1.5-3.5%
Manganese 0.5-1.0%
Sulfur <0.05%
Phosphorous <0.12%

The nodular cast iron thus produced even more preferably comprises, in addition to iron, the following weight percentages of elements:
Carbon 3.5-4.5%
Manganese <0.5%
Sulfur <0.02%
Phosphorous <0.04%

Referring now to FIG. 1, which illustrates a simplified block scheme of a preferred embodiment of a method for the production of cast iron according to the invention, 10 indicates as a whole a supply of pre-reduced iron ore (DRI).

The latter contains a carbon percentage higher than 2.8% by weight, preferably ranging from 3% to 6% by weight, and more preferably from 4% to 5%.

The metallization of the charge of pre-reduced iron ore (DRI) is at least 90% by weight, preferably at least 94% by weight.

The DRI charge is fed to an apparatus 20 according to the invention comprising an electric arc furnace, to be melted.

The DRI containing carbon can be charged into the melting chamber of the apparatus 20 at a temperature ranging from room temperature to 500° C. or higher (preferably up to 700° C.), the energy consumption of the melting process will obviously be lower with an increase in the charging temperature of the DRI.

The charging is effected using means known per se in the state of the art, for example by gravity, by means of a pneumatic transport system, by a mechanical conveyor provided with means for maintaining an inert atmosphere in contact with the hot DRI, or in thermally insulated containers (not shown as they are known in the art).

The DRI charge is then melted in the EAF at a temperature at least higher than 1,350° C., preferably ranging from 1,400° C. to 1,550° C.

Once the process has been completed, the contents of the furnace are discharged (tapped) (see 26) from the EAF.

It should be noted that the carbon content in the charge material (DRI) is already close to the target content of the cast iron to be produced.

The carbon content can optionally be adjusted by the addition of a further carbonaceous material.

In a first embodiment, this carbonaceous material is mixed with the DRI directly in the melting chamber of the apparatus.

The carbonaceous material 24 that can be used is, for example but not exclusively, carbon, coke, graphite or mixtures thereof.

In a second embodiment, alternatively to or combined with the first embodiment, the carbonaceous material 30 is subsequently mixed with the molten DRI, for example in a transfer ladle 28.

The carbonaceous material 30 that can be used is, for example but not exclusively, carbon, coke, graphite or mixtures thereof.

These additions are optional and are only necessary when the target carbon content of the cast iron to be produced exceeds the carbon content of the DRI.

The carbon content of the DRI is preferably equal to the target carbon content of the cast iron to be produced, so that the method expressly excludes the addition of carbon both in the melting chamber and subsequently.

According to the invention, the carbon content in the DRI charge is combined therein with iron, preferably mostly in the form of carbon carbide $Fe_3C$. The combined carbon provides a number of advantages in the electric arc furnace (EAF) with respect to the use of "free" carbon which can be added in the form of soot, coal, coke, graphite: soot is in fact easily entrained by the hot gases during the melting phase of the DRI, coal brings numerous impurities, among which sulfur which must be controlled and eliminated in the final composition of cast iron, coke has a high cost and graphite, as high-purity carbon, is even more expensive.

It is therefore evident that the use of the carbon content in DRI as carbon carbide $Fe_3C$ is economically convenient for the production of a commodity such as cast iron.

The tapping step 26 of the liquid cast iron thus obtained is set at a temperature which is such as to have a certain degree of overheating, preferably ranging from 1,400° C. to 1,550° C., also in relation to the melting point of the slag that is expected to be produced.

In this way, there can be sufficient time in the transfer ladle 28 for adjusting the desired final composition to meet the pre-determined chemical analysis of the cast iron in view of its final use.

Ferroalloys or scorifiers 30 can also be optionally introduced into the transfer ladle 28 containing liquid cast iron.

Said ferroalloys or scorifiers are known per se in the state of the art and consequently no further reference will be made herein to the same.

The liquid cast iron 32 is then discharged from the transfer ladle 28 and cast into forming containers 34 in the form of ingots 36, or it can be granulated through processes known in the art, thus forming the final cast iron.

The objectives of the present invention have therefore been achieved.

The invention claimed is:
1. A method for production of cast iron starting from pre-reduced iron ore (DRI) with an electric arc furnace (EAF), comprising the following steps:
  a. preparing a charge of the pre-reduced iron ore (DRI) having a metallization higher than 90% and containing up to 6.5% by weight of carbon, wherein at least 80% of said carbon is combined with iron to form iron carbide ($Fe_3C$);
  b. charging the charge of the pre-reduced iron ore (DRI) into the electric arc furnace (EAF) without adding free carbon; and
  c. melting the DRI charge to form liquid cast iron, wherein said liquid cast iron has a predetermined actual content of carbon, at least 80% by weight of said actual carbon content of the liquid cast iron deriving from the carbon in the charge of the pre-reduced iron ore (DRI), and wherein step c. is carried out in a reducing atmosphere and in a melting chamber of the electric arc furnace (EAF) subjected to a positive internal pressure generated by gases produced by reduction reactions that develop in step c.

2. The method according to claim 1, wherein at least 90% of said carbon in the charge of the pre-reduced iron ore (DRI) is combined with iron as the iron carbide ($Fe_3C$).

3. The method according to claim 1, wherein in step a said DRI charge is charged into the electric arc furnace at a temperature higher than 400° C.

4. The method according to claim 1, further comprising:
d. discharging contents of the EAF furnace downstream of step c into a transfer ladle or container.

5. The method according to claim 1, further comprising:
e. granulating the liquid cast iron, or
f. casting the liquid cast iron into ingots.

6. The method according to claim 1, wherein the cast iron is grey cast iron or nodular cast iron.

\* \* \* \* \*